(12) United States Patent
Toyoda et al.

(10) Patent No.: US 6,641,275 B2
(45) Date of Patent: Nov. 4, 2003

(54) SPREAD ILLUMINATING APPARATUS

(75) Inventors: Koichi Toyoda, Iwata-gun (JP); Takashi Ishii, Iwata-gun (JP)

(73) Assignee: Minebea Co., Ltd., Miyota (JP)

( * ) Notice: Subject to any disclaimer, the term of this patent is extended or adjusted under 35 U.S.C. 154(b) by 0 days.

(21) Appl. No.: 10/042,173

(22) Filed: Jan. 11, 2002

(65) Prior Publication Data
US 2002/0093810 A1 Jul. 18, 2002

(30) Foreign Application Priority Data
Jan. 17, 2001 (JP) ........................................ 2001-008967

(51) Int. Cl.[7] ................................................. F21V 7/04
(52) U.S. Cl. ............................. 362/31; 362/26; 362/27; 362/551; 362/560; 362/331; 362/330; 362/555
(58) Field of Search ............................. 362/26, 27, 31, 362/551, 560, 331, 330, 555, 278, 320; 385/901

(56) References Cited
U.S. PATENT DOCUMENTS
6,390,639 B2 * 5/2002 Suzuki et al. .................. 362/31

* cited by examiner

Primary Examiner—Sandra O'Shea
Assistant Examiner—M. Tsidulko
(74) Attorney, Agent, or Firm—Oliff & Berridge, PLC

(57) ABSTRACT

There is provided a spread illuminating apparatus to improve a coupling efficiency between a light conductive member and a spot-like light source. A claw (23) of an upper frame (21) is fitted to a recess (20) of an LED (6), and generates a spring force in a direction of a light conductive member (4) (a spring force in a longitudinal direction of the light conductive member (4)) in a fitted condition to press the LED (6) toward the light conductive member (4). Thus, the light conductive member (4) and the LED are excellently and tightly attached to each other, and surely positioned, and the coupling efficiency of the light conductive member (4) with the LED is excellent. Since the claw (23) of the upper frame 21 is fitted to the recess (20) in the LED (6), deviation of the LED (6) in a direction orthogonal to the longitudinal direction of the light conductive member (4) is suppressed, and the light conductive member (4) and the LED (6) can be surely positioned accordingly, and the coupling efficiency of the light conductive member (4) with the LED (6) can be further improved.

8 Claims, 7 Drawing Sheets

ND APPARATUS

BACKGROUND OF THE INVENTION

1. Field of the Invention

The present invention relates to a spread illuminating apparatus used as an illuminating means for signboards, various kinds of reflection-type display devices and the like, and more particularly to a spread illuminating apparatus used as an illuminating means for a liquid crystal display device.

2. Description of the Related Art

A demand for a liquid crystal display device as a display device mainly for computers has been increasing since the liquid crystal display device which operates with low power consumption is characterized by being low profile and lightweight. Since a liquid crystal which is a component of the liquid crystal display device does not emit light by itself unlike a light emitting element such as a cathode-ray tube, an illuminating means for viewing an image is required. In particular, in the recent demand for lower profile, there is a growing tendency to employ a thin plate-like spread illuminating apparatus of side light type (light conductive plate type) as an illuminating means for the liquid crystal display device.

An example of such a side light type spread illuminating apparatus is shown in FIGS. 7 to 12.

In FIGS. 7 and 8, this spread illuminating apparatus 1 is generally constituted such that a bar-like light source 3 is disposed close to one end surface 2a of a transparent substrate (a guide plate) 2 made of a light-transmissible material. A liquid crystal display device (not shown) is disposed on a lower surface side of the transparent substrate 2, and this spread illuminating apparatus 1 is used as an auxiliary illumination for the liquid crystal display device.

The transparent substrate 2 is formed in a so-called wedge-shape, in which as the distance from the end surface 2a increases, the thickness of the transparent substrate 2 gradually degreases.

The light source 3 is generally composed of a light conductive member (a guide rod) 4 made of a bar-like transparent material disposed close to and along the end surface 2a of the transparent substrate 2, an LED 6 (a spot-like light source) which is disposed facing one end part 4a of the light conductive member 4 and mounted on an FPC 5 (a printed circuit board) made of an insulating material, and a light reflection plate 7 disposed facing the other end part 4b of the light conductive member 4.

An optical path conversion means 8 is provided on an opposite side surface 4d (a second surface of the light conductive member) of a surface 4c (a first surface of the light conductive member) facing the transparent substrate 2 on the light conductive member 4. The optical path conversion means 8 is composed of grooves 8a each of which is substantially triangular in section, and flat portions 8b each of which is formed between two adjacent grooves 8a. Accordingly, the light rays from one end part 4a of the light conductive member 4 are uniformly radiated on the first surface 4c although the LED 6 is disposed on one end part 4a.

A light reflection pattern 9 composed of grooves 9a and flat portions 9b is formed on one surface (an upper part in FIG. 7, hereinafter, referred to as "upper surface") of the transparent substrate 2 so that the brightness is substantially uniform at any position of the transparent substrate 2 irrespective of the distance from the light conductive member 4.

The LED 6 is substantially rectangular, and a groove-shaped recess 20 extending in the vertical direction is formed in a substantially center part of the surface facing an abutting surface on the light conductive member 4.

The LED 6 has solder S applied to both ends 6a and 6b positioned to be aligned in a direction orthogonal to a longitudinal direction of the light conductive member 4 while disposed facing one end part 4a of the light conductive member 4 as shown in FIGS. 7, 10 and 11, and a terminal (not shown) is electrically connected to a copper foil (not shown) provided on the FPC 5, and mounted on the FPC 5 in this condition.

The FPC 5 is composed of a substantially rectangular FPC body 5a with the LED 6 or the like mounted thereon, and an FPC riser wall 5b formed on one end part of the FPC body 5a in a rising manner. The FPC rising wall 5b faces the LED 6, and is interposed between the LED 6 and a frame riser plate 10b as described below, so that the solder S is prevented to be short-circuited to a metal lower frame 10 (the frame riser plate 10b).

As shown in FIGS. 7, 9, 10 and 11, this spread illuminating apparatus is further provided with the metal frame (the lower frame 10) disposed on the lower surface side of the FPC 5, and a substantially plate-like frame (an upper frame 11) disposed facing the FPC 5 across the light conductive member 4, and holds the transparent substrate 2 and the light source 3. The lower frame 10 is substantially composed of a plate-like main body (a lower main body 10a) facing the lower face of the FPC 5 and extending along the light conductive member 4, and a riser plate (the frame riser plate 10b) substantially orthogonal to the lower main body 10a and rising from one end part (the right side in FIG. 10) of the lower main body 10a. The other end part (the left side in FIG. 10) of the lower main body 10a and the transparent substrate 2 are fixed to each other (in a condition where a holding part not shown in the figure is provided), allowing the LED 6 to be pressed toward the light conductive member 4 by the frame riser plate part 10b as described below.

The lower frame 10 allows the frame riser plate part 10b facing one end face 4a of the light conductive member 4 via the FPC riser wall part 5b, and presses the LED 6 toward the light conductive member 4 via the FPC riser wall part 5b.

Since the lower frame presses the LED 6 toward the light conductive member 4, a coupling efficiency between the light conductive member 4 and the LED 6 is improved, and a variance in tolerance of members is absorbed thereby.

The spread illuminating apparatus is requested to tightly attach the light conductive member and the LED to each other in a reliable condition to obtain excellent light characteristics, and accordingly to improve the coupling efficiency between the light conductive member and the LED. However, in the conventional technology, the LED 6 is pressed toward the light conductive member 4 via the FPC 5 (the FPC riser wall 5b), and thus, no large pressure is obtained, and accordingly, the improvement in the coupling efficiency has been restricted.

In addition, in the conventional technology, the LED 6 is easily shifted in the direction T (the vertical direction in FIG. 11, and conveniently, referred to as the "longitudinal direction") orthogonal to the longitudinal direction of the light conductive member 4, and the coupling efficiency is easily degraded, accordingly.

SUMMARY OF THE INVENTION

The present invention has been made in the light of the above problems, and an object of the present invention is therefore to provide a spread illuminating apparatus to improve the coupling efficiency between the light conductive member and the spot-like light source.

According to a first aspect of the present invention, there is provided a spread illuminating apparatus comprising a transparent substrate made of a light-transmissible material; a bar-like light source composed of a light conductive member made of a transparent material and formed bar-like and a spot-like light source disposed on at least one end of the light conductive member and mounted on a printed circuit board, and disposed close to and along at least one end of the transparent substrate; a frame having a plate-like main body disposed either under the printed circuit board or above the bar-like light source so as to oppose the printed circuit board, extending along the bar-like light source, and adapted to hold the transparent substrate and the bar-like light source; and a claw formed at an end of the main body so as to be in contact with the spot-like light source and adapted to press the spot-like light source toward the light conductive member.

According to a second aspect of the present invention, in the spread illuminating apparatus according to first aspect of the present invention, the spot-like light source has a recess in a face opposite to a face facing the light conductive member, and the claw is fitted in the recess.

According to a third aspect of the present invention, in the spread illuminating apparatus according to the second aspect of the present invention, the spot-like light source has solder applied to both end thereof positioned to be aligned in a direction orthogonal to a longitudinal direction of the light conductive member, and the recess is formed between the both ends so as to get clear of the solder.

According to a fourth aspect of the present invention, in the spread illuminating apparatus according to one of the second and third aspects of the present invention, the recess is groove-shaped and extends from one side of the spot-like light source, on which the main body is disposed, to the other side opposite to the side.

According to a fifth aspect of the present invention, in the spread illuminating apparatus according to one of the first to fourth aspects of the present invention, the frame is made of a springy material.

According to a sixth aspect of the present invention, in the spread illuminating apparatus according to one of the first to fifth aspects of the present invention, the spot-like light source is provided at each of both ends of the light conductive member, and the claw is formed at at least one end of the main body.

According to a seventh aspect of the present invention, in the spread illuminating apparatus according to one of the first to fifth aspects of the present invention, a spot-like light source is provided at one end of the light conductive member while a light reflection plate is provided at the other end thereof, one end of the main body is provided with the claw while the other end thereof is adapted to hold the light conductive member via the light reflection plate.

According to an eighth aspect of the present invention, in the spread illuminating apparatus according to one of the first to seventh aspects of the present invention, the spot-like light source is an LED.

DESCRIPTION OF THE PREFERRED EMBODIMENTS

Figure 1:
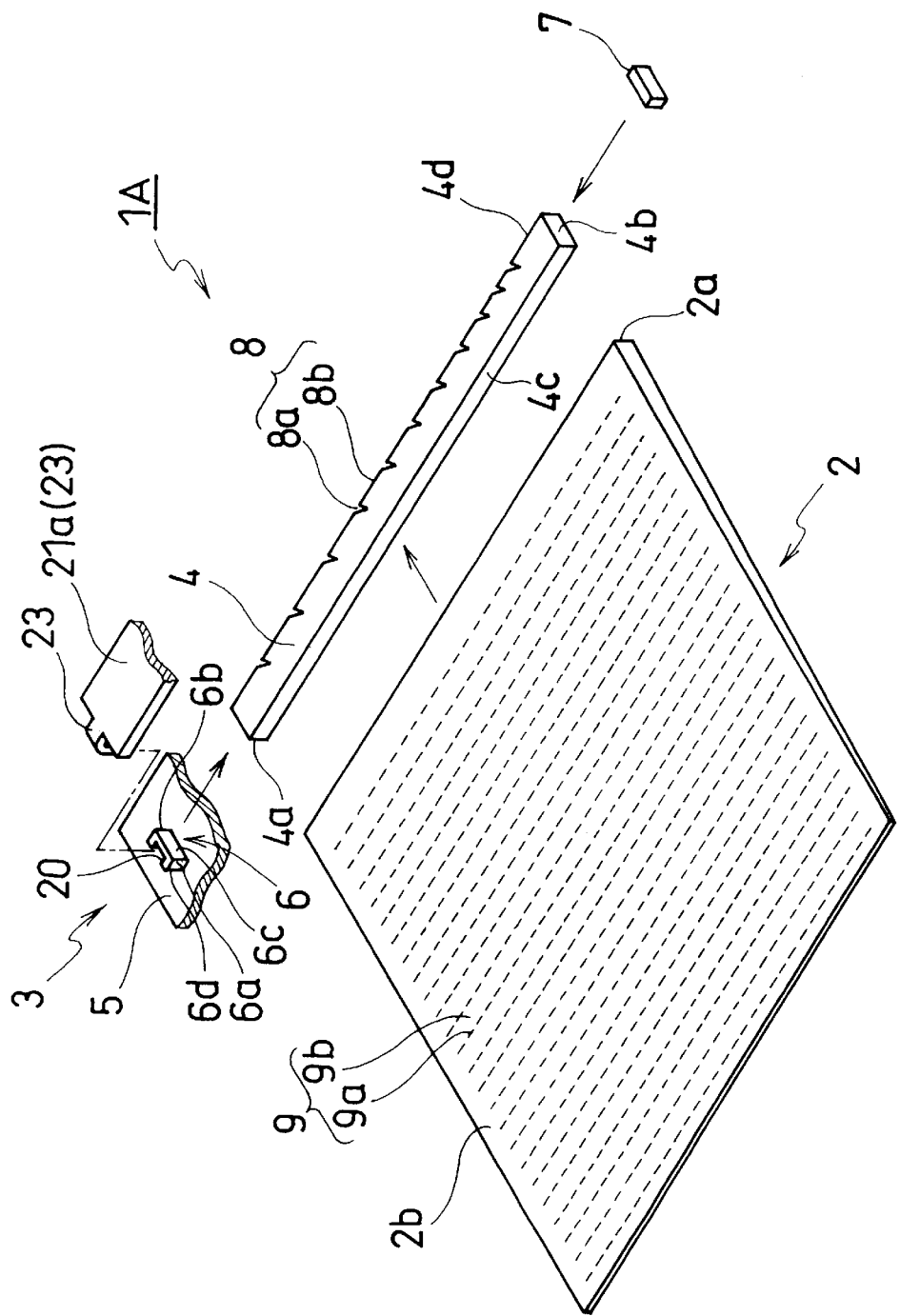
FIG. 1 is an exploded perspective view showing a spread illuminating apparatus according to a first embodiment of the present invention.

A spread illuminating apparatus 1A according to a first embodiment of the present invention is hereinafter explained referring to FIGS. 1 to 4. The parts and components identical with or corresponding to those in FIGS. 7 to 12 are represented by the same reference numerals and detailed description thereof is omitted.

Figure 2:
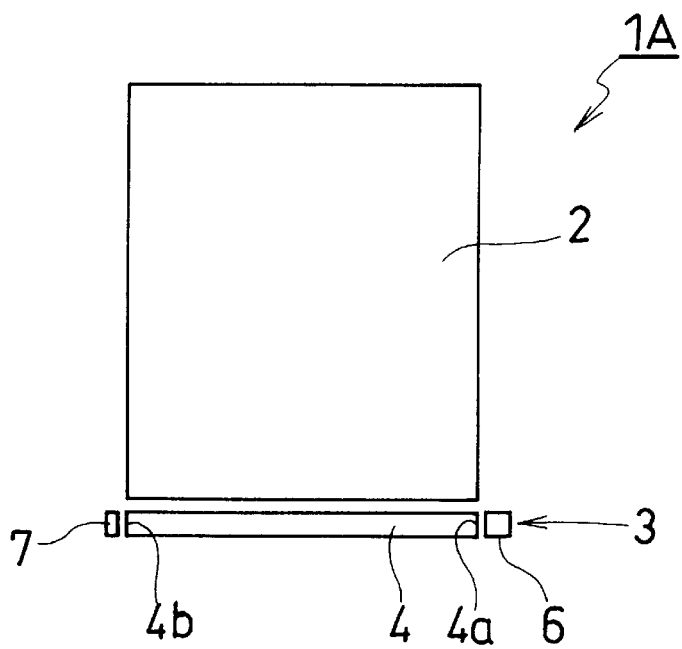
FIG. 2 is a schematic plan view showing the arrangement of a transparent substrate and a light source (a light conductive member, an LED and a light reflection plate) in FIG. 1.

This spread illuminating apparatus 1A is generally composed such that a bar-like light source 3 is disposed close to one end 2a of a transparent substrate 2 made of a light-transmissible material, as shown in FIGS. 1 and 2. A liquid crystal display device (not shown) is disposed on the lower surface side of the transparent substrate 2, and the spread illuminating apparatus 1A is used as an auxiliary illumination for the liquid crystal display device.

The light source 3 is generally composed of a long plate-like light conductive member 4 disposed along and close to one end 2a of the transparent substrate 2 and made of a transparent material, an LED 6 (a spot-like light source) disposed facing one end part 4a of the light conductive member 4 and comprising a light-emitting diode mounted on an FPC 5, and a light reflection plate 7 disposed facing the other end part 4b of the light conductive member 4.

An optical path conversion means 8 is provided on an opposite side surface 4d (a second surface of the light conductive member) of a surface 4c (a first surface of the light conductive member) facing the transparent substrate 2 on the light conductive member 4. The optical path conversion means 8 is composed of grooves 8a each of which is substantially triangular in section, and flat portions 8b each of which is formed between the adjacent grooves 8a.

Accordingly, the light rays from one end part 4a of the light conductive member 4 are uniformly radiated on the first surface 4c of the light conductive member although the LED 6 is disposed on one end part 4a.

A light reflection pattern 9 composed of grooves 9a and flat portions 9b is formed on one surface (an upper side in FIG. 1, hereinafter, referred to as "upper surface") of the transparent substrate 2 so that the brightness is substantially uniform at any position of the transparent substrate 2 irrespective of the distance from the light conductive member 4.

The LED 6 is substantially rectangular, and a groove-shaped recess 20 extending in the vertical direction is formed in a substantially center part of a face 6d opposite to a face 6c facing the light conductive member 4. The recess 20 is groove-shaped and extends from one side 6e of the LED 6 (an upper side in FIG. 3), on which an upper main body 21a described below is disposed, to the other side 6f opposite to the side 6e.

Figure 3:
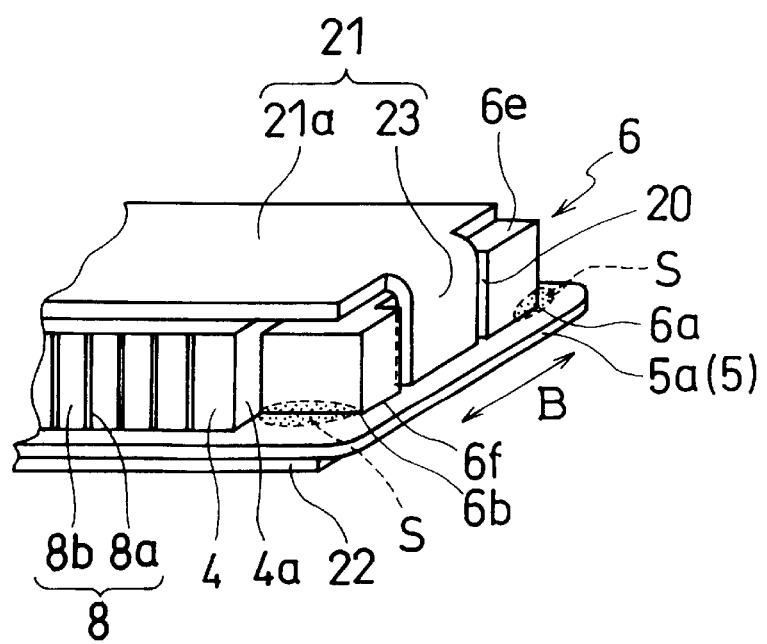
FIG. 3 is a schematic perspective view showing the arrangement of the LED, the light conductive member and an upper frame in FIG. 1.
Figure 4:
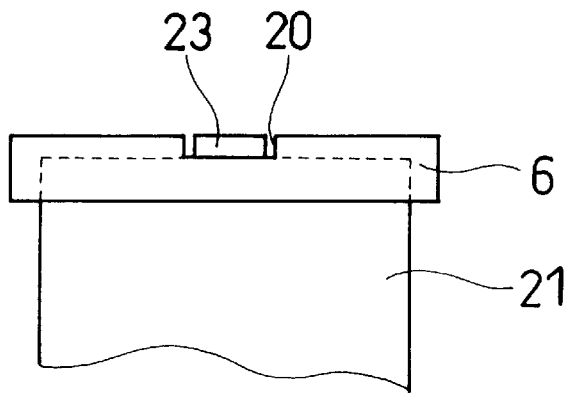
FIG. 4 is a schematic bottom plan view showing the arrangement of a recess of the LED and a claw of the upper frame in FIG. 2.

The LED 6 has solders S applied to both ends 6a and 6b thereof to be aligned in a direction orthogonal to a longitudinal direction of the light conductive member 4 while disposed facing one end part 4a of the light conductive member 4 as shown in FIGS. 1, 3 and 4, and a terminal (not shown) is electrically connected to a copper foil (not shown) provided on the FPC 5, and mounted on the FPC 5 in this condition. The recess 20 of the LED 6 is formed substantially in the center part of the face 6d as described above, and both ends 6a and 6b have solders S, and thus, the recess 20 is formed between both ends 6a and 6b so as to get clear of the solders S.

The FPC 5 is composed of a substantially rectangular FPC body 5a with the LED 6 or the like mounted thereon, and the FPC body 5a is provided with copper foil, and connected to an external power source or the like (not shown) via the copper foil.

As shown in FIGS. 3 and 4, the spread illuminating apparatus 1A is provided with a frame made of a springy metal material (an upper frame 21) disposed on a lower surface side of the FPC 5, and a metal or resin, substantially plate-like frame (a lower frame 22) disposed facing the upper frame 21 across the light conductive member 4 and the FPC 5, and holds the transparent substrate 2 and the light source 3.

The upper frame 21 is generally composed of a plate-like main body (an upper main body 21a) extending along the light conductive member 4, and a plate-like claw 23 formed on one end part side (the right side in FIG. 3) of the upper main body 21a in a substantially orthogonal manner (with a slightly acute angle) to the upper main body 21a, and fitted to the recess 20 in the LED 6. The other end part (the left side in FIG. 3) of the upper main body 21a presses the light conductive member 4 via a light reflection plate (with a holding part not shown in the figure provided thereon), allowing the LED 6 to be pressed toward the light conductive member 4 by the claw 23. This means that the claw 23 is fitted to the recess 20, the spring force is demonstrated in the direction of the light conductive member 4 in a fitted condition, and the LED 6 is pressed toward the light conductive member 4.

In the present embodiment, the claw 23 of the upper frame 21 is fitted to the recess 20 of the LED 6, the spring force in the direction of the light conductive member 4 (the spring force in the longitudinal direction of the light conductive member 4) is demonstrated in the fitted condition, and the LED 6 is pressed toward the light conductive member 4. Thus, the light conductive member 4 and the LED are excellently and closely attached to each other, and surely positioned, and the coupling efficiency of the light conductive member 4 with the LED is excellent, accordingly.

In the above-mentioned conventional technology, the LED 6 is pressed toward the light conductive member 4 via the FPC 5 (the FPC riser wall 5b), and no large pressure is obtained, and the improvement in the coupling efficiency has been restricted. On the contrary, in the present embodiment, the claw 23 is abutted on the LED 6, the spring force of the claw 23 is directly applied to the LED 6 to press the LED 6 toward the light conductive member 4, and thus, the coupling efficiency of the light conductive member 4 with the LED 6 can be increased.

Further, since the claw 23 of the upper frame 21 is fitted to the recess 20 in the LED 6, deviation of the LED 6 in the direction orthogonal to the longitudinal direction of the light conductive member 4 (the direction of the arrow B in FIG. 3) is suppressed, the light conductive member 4 and the LED 6 can be surely positioned, accordingly, and the coupling efficiency of the light conductive member 4 with the LED 6 can be further improved.

In the present embodiment, the recess 20 in the LED 6 is formed substantially in the center part of the face 6d opposite to the face 6c facing the light conductive member 4 as described above, both ends 6a and 6b have solders S, and the recess 20 is formed between both end parts 6a and 6b so as to get clear of the solders S. Thus, even when the claw 23 of the upper frame 21 is fitted to the recess 20, the claw 23 is not brought into contact with the solders S, preventing generation of failures attributable to short circuits.

In the present embodiment, the claw 23 of the upper frame 21 is substantially orthogonal to the upper main body 21a, simple in shape, and easy in manufacture, and its productivity can be improved. Further, in place of the plate-like claw 23 of the upper frame 21, a recess in the LED 6 may be a circular or rectangular hole, and the claw 23 of the upper frame 21 may be composed of a claw body (not shown) formed substantially orthogonal (with a slightly acute angle) to the upper main body 21a, and a claw fitting part (not shown) to be fitted to the above circular or rectangular hole-shaped recess which is formed orthogonal to the claw body so as to form a substantial L-shape together with the claw body.

In the present embodiment, the upper frame 21 (the upper main body 21a and the claw 23) is made of a metal, however, this component may be made of a resin.

Figure 5:
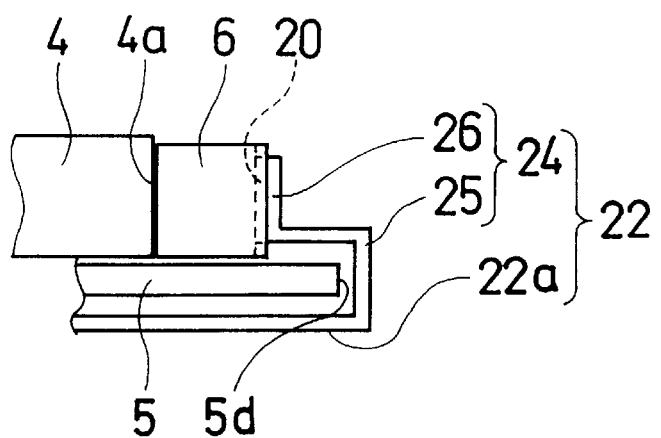
FIG. 5 is a schematic front view showing a spread illuminating apparatus according to a second embodiment of the present invention.

In the above embodiment, the claw 23 is provided on the upper frame 21 (the upper main body 21a), however, the present invention is not limited thereto, and, for example, as shown in FIG. 5, a claw 24 may be provided on a lower frame 22 (a second embodiment).

This means that, in FIG. 5, the lower frame 22 is composed of a plate-like lower main body 22a disposed on the lower surface side of the FPC 5, and the claw 24 bent on one end (the right side in FIG. 5) of the lower main body 22a. The other end side (the left side in FIG. 5) of the lower main body 22a is held by the light conductive member 4, and the lower frame 22 is prevented from being moved in the longitudinal direction (the right-to-left direction in FIG. 5) of the light conductive member 4. The claw 24 is composed of a substantially L-shaped claw base end 25 extended on the lower main body 22a so as to form substantial U-shape together with the lower main body 22a and extending to the LED 6 side across the end part 5d (the right side in FIG. 5) of the FPC 5, and a plate-like claw tip 26 to be bent on the tip side of the claw base end 25 and fitted to the recess 20 in the LED 6.

In this second embodiment, the claw 24 works similar to the claw 23 in the first embodiment, and generates the spring force to press the LED 6 toward the light conductive member 4. Similar to the first embodiment, the light conductive member 4 and the LED 6 can surely be positioned, and the coupling efficiency of the light conductive member 4 and the LED 6 is excellent, accordingly.

Figure 6:
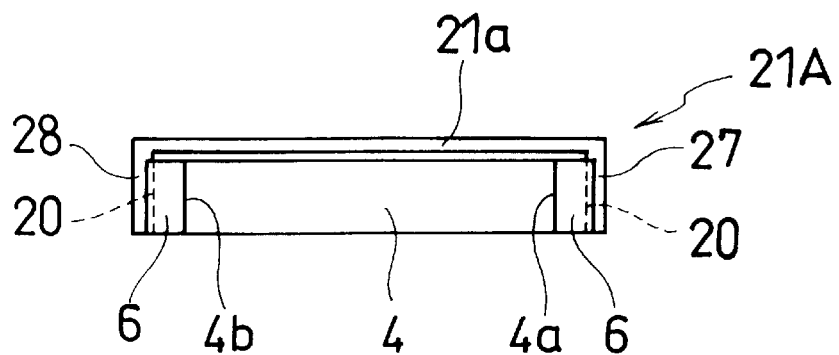
FIG. 6 is a schematic front view showing a spread illuminating apparatus according to a third embodiment of the present invention.
Figure 7:
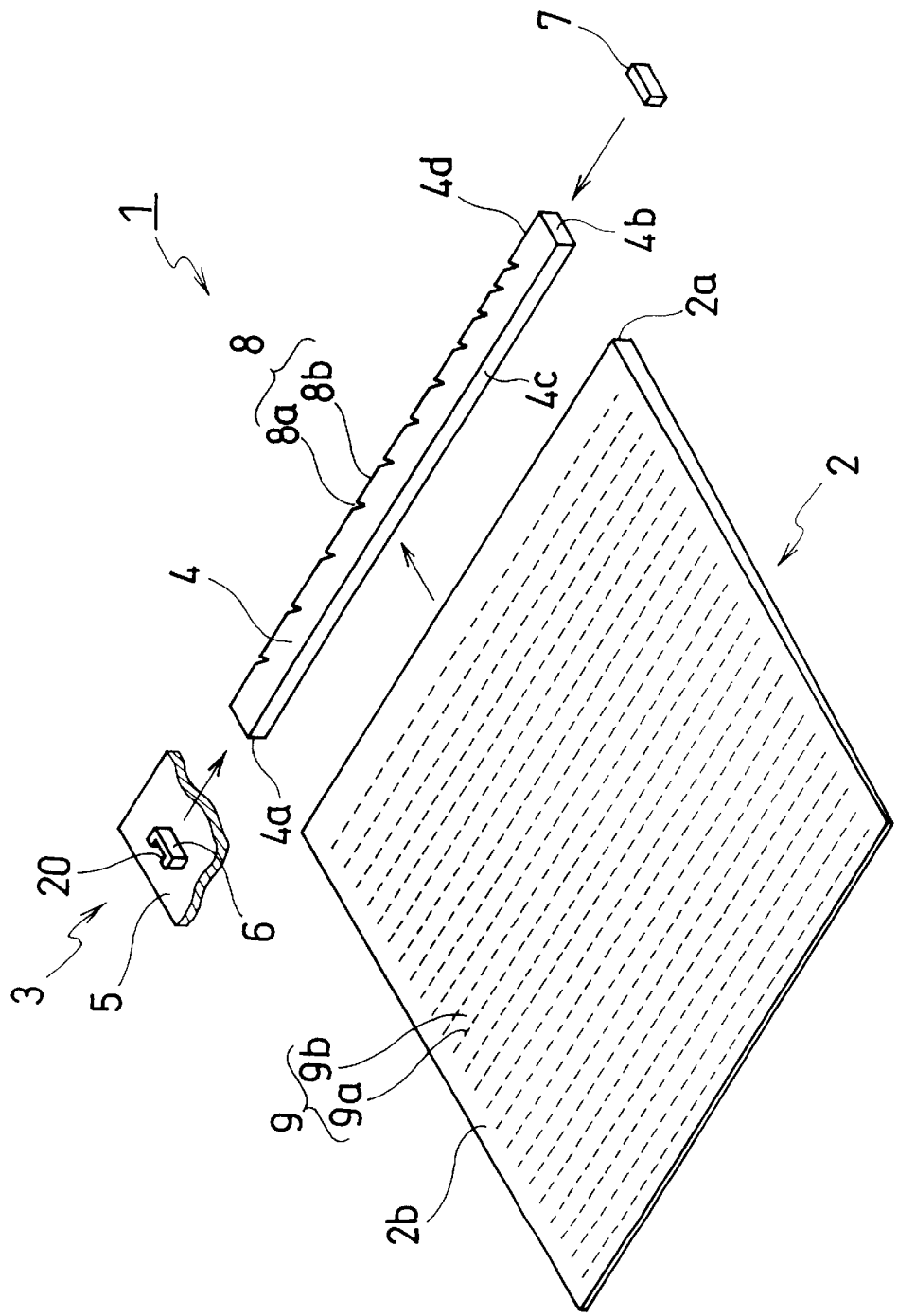
FIG. 7 is a perspective view showing an example of a conventional spread illuminating apparatus.
Figure 8:
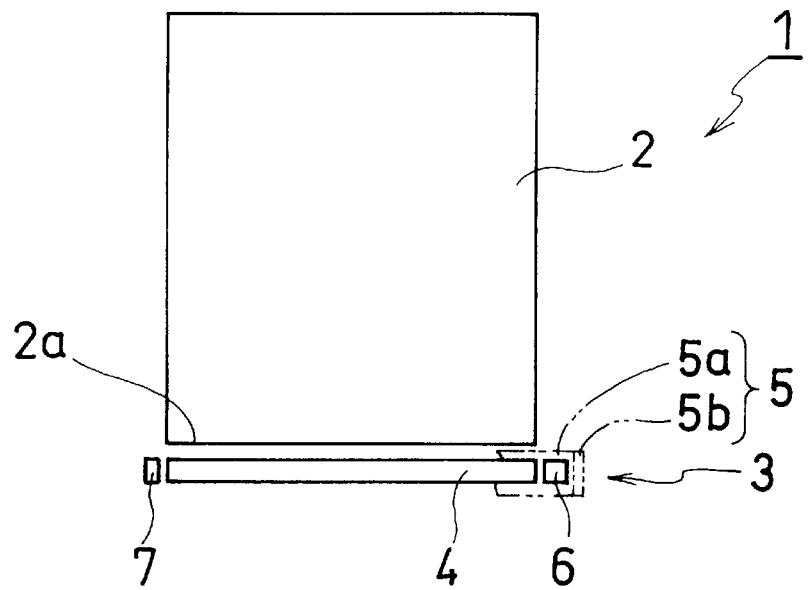
FIG. 8 is a schematic plan view showing the arrangement of a transparent substrate and a light source (a light conductive member, an LED and a light reflection plate) in FIG. 7.
Figure 9:
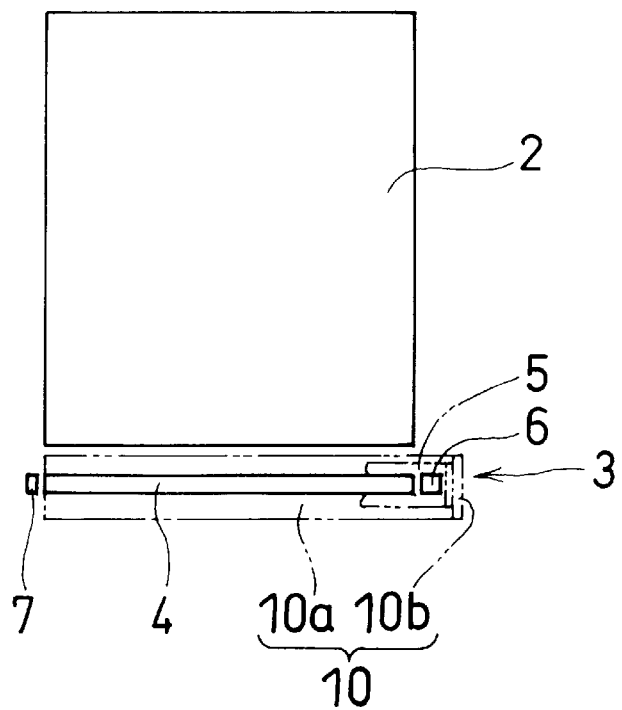
FIG. 9 is a schematic plan view showing the arrangement of the transparent substrate, the light source and a lower frame in FIG. 7.
Figure 10:
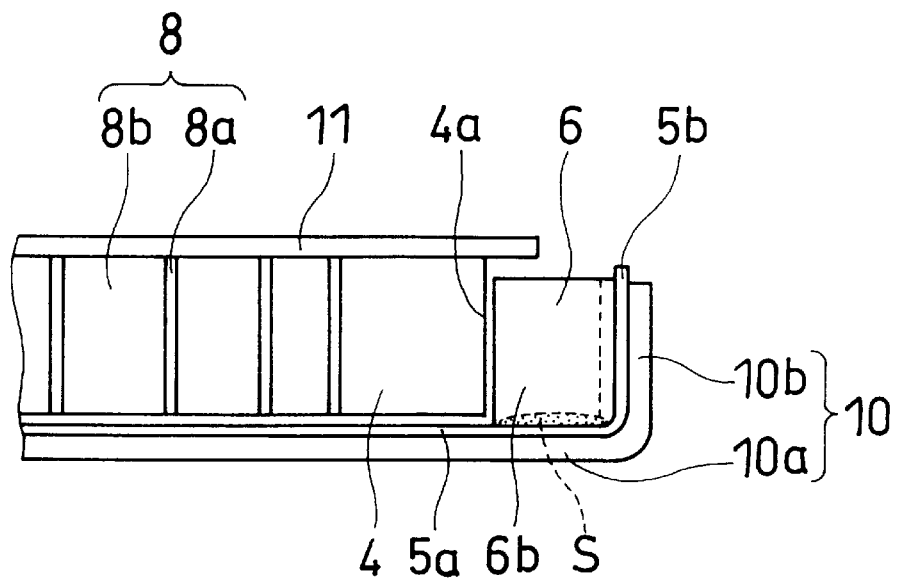
FIG. 10 is a schematic front view of the spread illuminating apparatus in FIG. 7.
Figure 11:
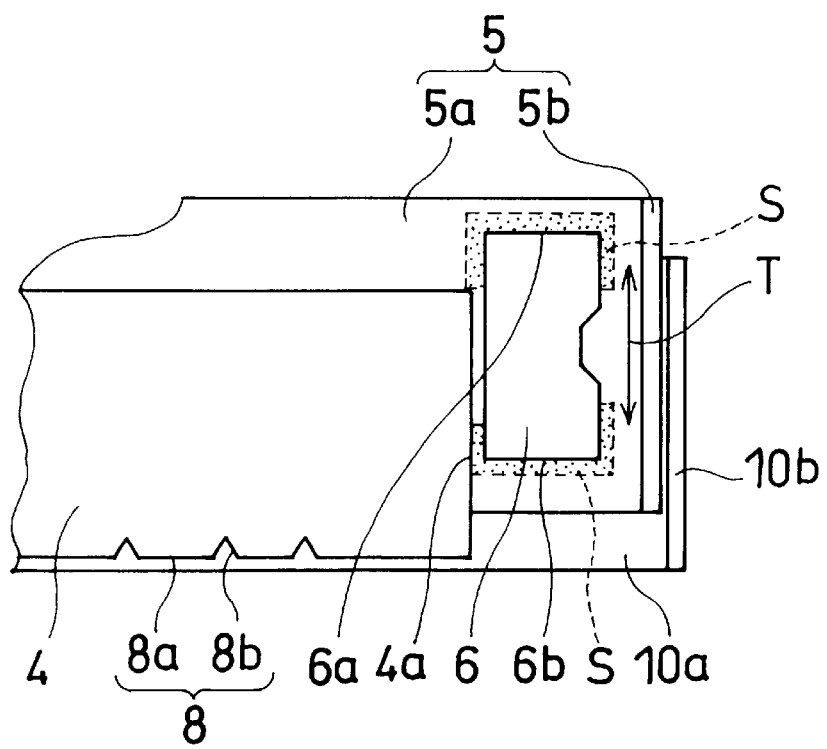
FIG. 11 is a schematic plan view of the spread illuminating apparatus in FIG. 7.
Figure 12:
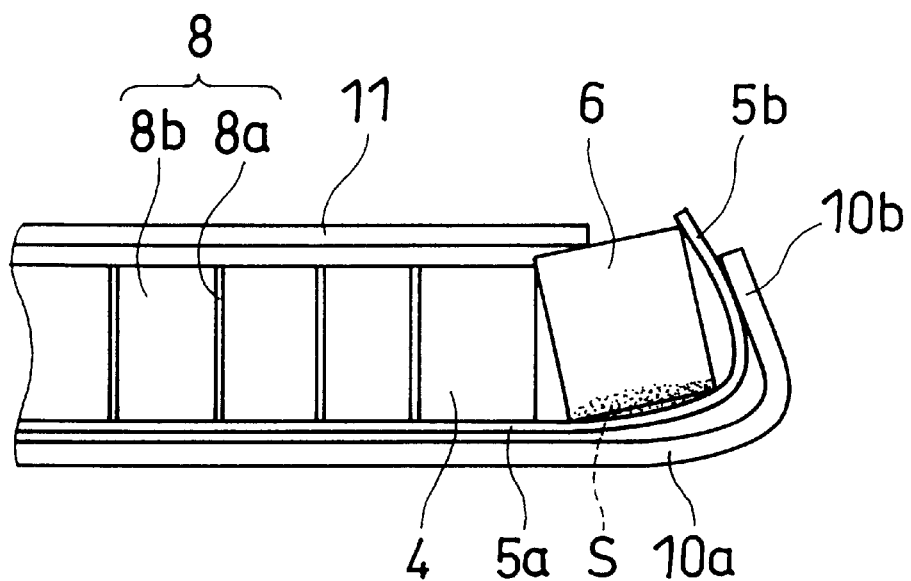
FIG. 12 is a schematic view of the LED pressed toward the light conductive member via an FPC.

In the above embodiment, an example is given that the LED 6 (spot-like light source) is disposed on one end part 4a of the light conductive member 4, however, in place thereof, the LED 6 (spot-like light source) may be provided at both ends 4a and 4b sides of the light conductive member 4 without providing any light reflection plate 7 as shown in FIG. 6 (a third embodiment). In FIG. 6, an upper frame 21A is generally composed of an upper main body 21a, a plate-like claw 27 formed on one end part (the right side in FIG. 6) of the upper main body 21a, and a plate-like claw 28 formed on the other end part (the left side in FIG. 6) of the upper main body 21a substantially orthogonal to the upper main body 21a (with a slightly acute angle).

The claw 27 is fitted to the recess 20 in the LED 6 on one end side of the light conductive member 4, while the other claw 28 is fitted to the recess 20 in the LED 6 on the other end side of the light conductive member 4. The claws 27 and 28 of the upper frame 21A demonstrate the spring force to the counter direction in a fitted condition to each recess 20 in the LED 6.

In this third embodiment, both the claws 27 and 28 generate the spring force to press the LED 6 toward the light conductive member 4 similar to the claw 23 according to the first embodiment. Similar to the first embodiment, the light conductive member 4 and the LED 6 are surely positioned, and the coupling efficiency of the light conductive member 4 with the LED 6 is excellent.

According to any one of the first to eighth aspects of the present invention, the claw of the frame is abutted on the spot-like light source to press the spot-like light source toward the light conductive member, and thus, both the light conductive member and the spot-like light source are excellently and closely attached to each other, and surely positioned, and the coupling efficiency between them can be improved.

According to the second aspect of the present invention, the claw of the frame is fitted to the recess of the spot-like light source, and thus, the spot-like light source is pressed toward the light conductive member in the longitudinal direction thereof, and the coupling efficiency of the light conductive member with the spot-like light source makes excellent, and at the same time, the movement of the spot-like light source in the direction orthogonal to the longitudinal direction of the light conductive member is prevented, and the light conductive member and the spot-like light source can surely be positioned accordingly, and the coupling efficiency between them can be further improved.

According to the third aspect of the present invention, the spot-like light source can be pressed toward the light conductive member by the claw of the frame so as to get clear of the solder, and generation of failures attributable to short circuits can be avoided even when the frame is made of a metal.

According to the fourth aspect of the present invention, the claw of the upper frame is substantially orthogonal to the upper main body, simple in shape, and easy in manufacture, and the productivity can be improved.

According to the fifth aspect of the present invention, the frame is made of a springy material, and the force to press the spot-like light source toward the light conductive member can be easily generated.

According to the sixth and seventh aspects of the present invention, the claws on both ends of the main body generate the force to press the spot-like light source toward the light conductive member, and the coupling efficiency can be efficiently improved.

What is claimed is:

1. A spread illuminating apparatus comprising:

a transparent substrate made of a light-transmissible material;

a bar-like light source composed of a light conductive member made of a transparent material and a spot-like light source disposed on at least one end of said light conductive member and mounted on a printed circuit board, and disposed close to and along at least one end of said transparent substrate;

a frame having a plate-like main body disposed either under said printed circuit board or above said bar-like light source so as to oppose said printed circuit board, extending along said bar-like light source, and adapted to hold said transparent substrate and said bar-like light source; and a claw formed at an end of said main body so as to be in direct contact with said spot-like light source and adapted to press said spot-like light source toward said light conductive member.

2. A spread illuminating apparatus according to claim 1, wherein said spot-like light source has a recess in a face opposite to a face facing said light conductive member, and said claw is fitted in said recess.

3. A spread illuminating apparatus according to claim 2, wherein said spot-like light source has solder applied to both ends thereof positioned to be aligned in a direction orthogonal to a longitudinal direction of said light conductive member, and said recess is formed between said both ends so as to get clear of said solder.

4. A spread illuminating apparatus according to claim 2, wherein said recess is groove-shaped and extends from one side of said spot-like light source, on which said main body is disposed, to the other side opposite to said side.

5. A spread illuminating apparatus according to claim 1, wherein said frame is made of a springy material.

6. A spread illuminating apparatus according to claim 1, wherein said spot-like light source is provided at each of both ends of said light conductive member, and said claw is formed at at least one end of said main body.

7. A spread illuminating apparatus according to claim 1, wherein said spot-like light source is provided at one end of said light conductive member while a light reflection plate is provided at the other end thereof, one end of said main body is provided with said claw while the other end thereof is adapted to hold said light conductive member via said light reflection plate.

8. A spread illuminating apparatus according to claim 1, wherein said spot-like light source is an LED.

* * * * *